US006625785B2

(12) United States Patent
Chatterjee et al.

(10) Patent No.: US 6,625,785 B2
(45) Date of Patent: Sep. 23, 2003

(54) METHOD FOR DIAGNOSING PROCESS PARAMETER VARIATIONS FROM MEASUREMENTS IN ANALOG CIRCUITS

(75) Inventors: Abhijit Chatterjee, Marietta, GA (US); Sasikumar Cherubal, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 72 days.

(21) Appl. No.: 09/838,404

(22) Filed: Apr. 19, 2001

(65) Prior Publication Data

US 2002/0072872 A1 Jun. 13, 2002

Related U.S. Application Data

(60) Provisional application No. 60/198,206, filed on Apr. 19, 2000.

(51) Int. Cl.[7] .................................................. G06F 17/50
(52) U.S. Cl. .................................................. 716/4; 716/1
(58) Field of Search ................................ 716/4, 1

(56) References Cited

U.S. PATENT DOCUMENTS

| | | | | |
|---|---|---|---|---|
| 5,539,652 | A | * | 7/1996 | Tegethoff ..................... 703/14 |
| 6,212,667 | B1 | * | 4/2001 | Geer et al. ..................... 716/6 |
| 2001/0010091 | A1 | * | 7/2001 | Noy ............................... 716/4 |
| 2002/0002698 | A1 | * | 1/2002 | Hekmatpour ................... 716/4 |
| 2002/0133772 | A1 | * | 9/2002 | Voorakaranam et al. ..... 714/732 |

OTHER PUBLICATIONS

Variyam et al, "Specification–driven test design for analog circuits", IEEE, 1998.*
C.J.B. Spanos & S.W. Director, "Parameter Extraction for Statistical IC Process Characterization," IEEE Transactions on Computer–Aided Design, vol. 5, Cad–5 (Jan. 1986) 66–78.

G. Freeman, W. Lukaszek & J.Y.C. Pan, "Merlin: A Device Diagnosis System Based on Recursive Inverse Approximation," IEEE Transactions on Semiconductor Manufacturing, vol. 6, No. 4 (Nov. 1993) 306–317.
M. Qu & M.A. Styblinski, "Parameter Extraction for Statistical IC Modeling Based on Recursive Inverse Approximation," IEEE Transaction on Computer–Aided Design of Integrated Circuits and Systems, vol. 6, No. 11 (Nov. 1997) 1250–1259.
S. Cherubal & A. Chatterjee, "Parametric Fault Diagnosis for Analog Systems Using Functional Mapping," Proceedings, Design, Automation and Test in Europe (1999) 195–200.
E. Liu, W. Kao, E. Felt & A. Sangiovanni–Vincentelli, "Analog Testability Analysis and Fault Diagnosis Using Behavioral Modeling," Proceedings, IEEE Custom Integrated Circuits Conference (1994) 413–416.
D.A. Coley.
S. Chakrabarti & A. Chatterjee, "Partial Simulation–Driven Test Generation for Fault Detection and Diagnosis in Analog Circuits," Proceedings, ICCAD (2000) 562–567.

(List continued on next page.)

Primary Examiner—Leigh M. Garbowski
Assistant Examiner—Brandon Bowers
(74) Attorney, Agent, or Firm—Birdwell, Janke & Durando, PLC

(57) ABSTRACT

A method for diagnosing process parameter variations from measurements in analog circuits. The diagnosability conditions for the accurate computation of device parameters are extended in the presence of measurement noise. In case this diagnosability condition is not met by standard test signals, a method is provided for automatically generating optimized tests that enable the computation of device parameters. The test generator explicitly optimizes the ability to compute device parameters from the test response. A cause-effect analysis engine is provided to diagnose the cause of variation in IC performance metrics in terms of the variation in device parameter values. Once the cause of parametric yield loss is diagnosed in terms of device parameters variations, the information can be used by process engineers to tune the manufacturing process to improve yield.

8 Claims, 7 Drawing Sheets

OTHER PUBLICATIONS

P.N. Variyam & A. Chatterjee, "Specification–Driven Test design for Analog Circuits," International Symposium on Defect and Fault Tolerance in VLSI Systems (1998) 335–340.

P.N. Variyam & A. Chatterjee, "Test Generation for Comprehensive Testing of Linear Analog Circuits Using Transient Response Sampling," International Conference on Computer–Aided Design (1997) 382–385.

R. Voorakaranam & A. Chatterjee, "Test Generation for Accurate Prediction of Analog Specifications," Proceedings, IEEE VLSI Test Symposium (2000) 137–142.

J.H. Friedman, "Multivariate Adaptive Regressions Splines," The Annals of Statistics vol. 19, No. 1, 1–141.

B. Kaminska, K. Arabi, I. Bell, P. Goeteti, J.L. Huertas, B. Kim, A. Rueda and M. Soma, "Analog and Mixed–Signal Benchmark Circuits—First Release," Proceedings, International Test Conference (1997)183–190.

S. Cherubal & A. Chatterjee, "Optimal INL/DNL Testing of ADCs Using a Linear Model," Proceedings, International Test Conference (2000).

G.N. Stenbakken & T.M. Souders, "Test–Point Selection and Testability Mesures via QR Factorization of Linear Models," IEEE Transactions on Instrumentation and Measurement, vol. IM–36, No. 2 (Jun. 1987) 406–410.

T.M. Souders & G.N. Stenbakken, "A Comprehensive Approach to Modeling and Testing of Mixed–Signal Devices," Proceeding of IEEE International Test Conference (1990) 169–176.

G.N. Stenbakken & T.M. Souders, "Linear Error Modeling of Analog and Mixed–Signal Devices," Proceeding of IEEE International Test Conference (1991) 573–581.

G.N. Stenbakken & T.M. Souders, "Developing Linear Error Models for Analgo Devices," IEEE Transactions on Instrumentation and Measurements, vol. 43, No. 2 (Apr. 194) 157–163.

T.D. Lyons, "The Production Implementation of a Linear Error Modeling Technique," Proceeding of IEEE International Test Conference (1992) 399–404.

P.D. Capofreddit & B.A. Wooley, "The Use of Linear Models in A/D Converter Testing," IEEE Transactions on Circuits and Systems–I: Fundamental Theory and Applications, vol. 44, No. 12 (Dec. 1997) 1105–1113.

P.D. Capofreddit & B.A. Wooley, "The Use of Linear Models for the Efficient and Accurate Testing of A/D Converters," Proceeding of IEEE International Test Conference (1995) 54–60.

L. Blair, "Histogram Measurement of ADC Nonlinearities Using Sine Waves," IEEE Transactions on Instrumentation Measurement, vol. 43, No. 3 (Jun. 1994) 373–383.

P. Carbone & D. Petri, "Noise Sensitivity of ADC Histogram Test," IEEE Instrumentation and Measurement Technology Conference (1998) 88–91.

S. Cherubal & A. Chatterjee, "Test Generation Based Diagnosis of Device Parameters for Analog Circuits," IEEE (2001) 596–602.

N.B. Hamida & B. Kaminska, "Analog Circuit Testing Based on Sensitivity Computation and New Circuit Modeling," Proceeding, International Test Conference (1993) 331–343.

G. Devarayanadurg & M. Soma, "Dynamic Test Signal Design for Analog Ics," Proceedings, International Conference on Computer–Aided Design (1995) 627–629.

H.H. Zheng, A. Balivada & J. A. Abraham, "A Novel Test Generation Approach for Parametric Faults in Linear Analog Circuits," VLSI Test Symposium (1996) 470–475.

N. Nagi, A. Chatterjee, A. Balivada & J.A. Abraham, "Fault–Based Automatic Test Generation for Linear Analog Devices," Proceedings, International Conference on Computer–Aided Design (1993) 88–91.

P.N. Variyam, J. Hou & A. Chatterjee, "Efficient Test Generation for Transient Testing of Analog Circuits Using Partial Numerical Simulation," Proceedings, IEEE VLSI Test Symposium (1999) 214–219.

R. Voorakaranam & A. Chatterjee, "Hierarchical Test Generation for Analog Circuits Using Incremental Test Development," Proceedings, IEEE VLSI Test Symposium (1999) 296–301.

W.M. Lindermeir, H.E. Graeb & K.J. Antreich, "Analog Testing by Characteristic Observation Inference," IEEE Transactions on Computer–Aided Design of Integrated Circuits and Systems, vol. 18 (Sep. 1999) 1353–1368.

A. V. Gomes & A. Chatterjee, "Minimal Length Diagnostic Tests for Analog Circuits Using Test History," Design, Automation and Test in Europe (1999) 189–194.

D.S. Watkins, Fundamentals of Matrix Computations (John Wiley and Sons, 1991).

D. Levine, "PGAPack Parallel Genetic Algorithm Library," Department of Mathematics and Computer Science, Argonne National Laboratory.

S. Dowdy & S. Wearden, "Statistics for Research" (John Wiley and Sons, 1991).

G. Devarayanadurg, P. Goeteti & M. Soma, "Hierarchy Based Statistical Fault Simulation of Mixed–Signal ICs," International Test Conference (1996) 521–527.

R. Pease, "Troubleshooting Analog Circuits," (Butterworth Heinmann, 1990) 90–96.

T. Kuyel, "Linearity Testing Issues of Analog to Digital Converters," Proceeding of IEEE International Test Conference (1999) 747–756.

"Definition of Terms A/D Converters," National Semiconductor Data Acquistion Handbook (National Semiconductor, 1995) 2.4–2.5.

S. Max, "Testing of High Speed Accuracy Analog to Digital Converters Embedded in Systems on a Chip," Proceeding of IEEE International Test Conference (1999) 763–771.

J. Doernberg, H.S. Lee & D.A. Hodges, "Full–Speed Testing of A/D Converters," IEEE Journal of Solid–State Circuits, vol. SC–10, No. 6 (Dec. 1984) 820–827.

S. Max, "Fast Accurate and Complete ADC Testing," Proceeding of International Test Conference (1989) 11–117.

B. Ravazi, "Principles of Data Converters System Design," IEEE Press (New York, 1995).

A. W. Drake, "Fundamentals of Matrix Computations" (John Wiley And Sons, 1991).

ADC0831 8–bit Ser. I/O CMOS A/D/ Converters with Multiplexer Option, at http://www.national.com/pf/Ad/ADC0831.html, National Semiconductor Corporation (Jul. 1999).

LM7805C Series 3–Terminal Positive Voltage Regulators, at http://www.national.com/pf/LM/LM7805C.html, National Semiconductor Corporation (Jul. 1999).

"Lab VIEW User Manual," National Instruments (Jan. 1998).

PCI–61XE Families—E Series Multifunction I/O—5MS/s, 12–bit, Simultaneous Sampling, 2 or 4 Analog Inputs, National Instruments Measurements and Automation Catalogue, p. 236; also at http://www.natinst.com/apps/we/nioc.vp?lang=US&pc=mn&cid=1030.

\* cited by examiner

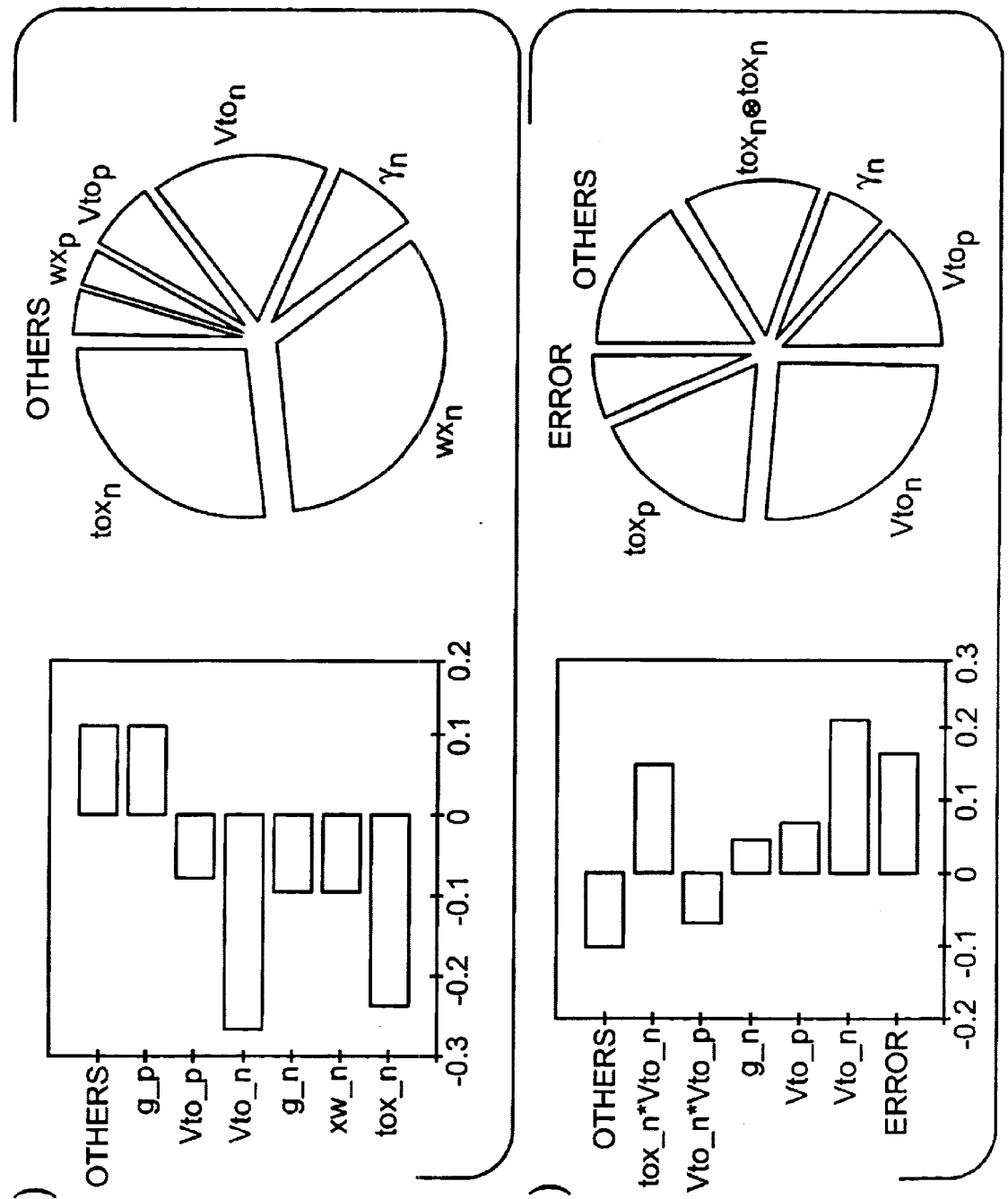
Fig. 9(a) SLEW RATE
Fig. 9(b) PSRR

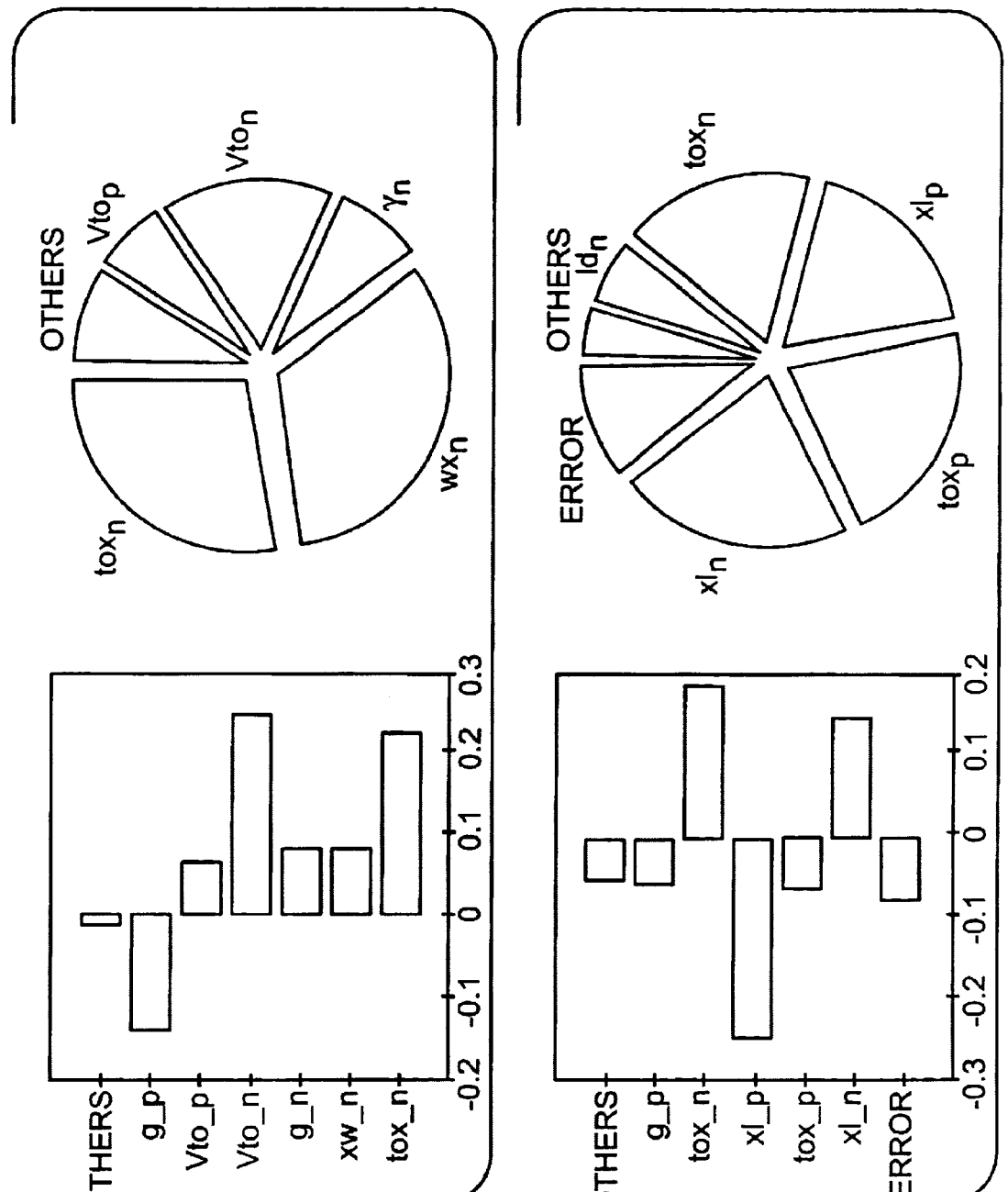
Fig. 9(c) SUPPLY CURRENT
Fig. 9(d) LARGE SIGNAL GAIN

METHOD FOR DIAGNOSING PROCESS PARAMETER VARIATIONS FROM MEASUREMENTS IN ANALOG CIRCUITS

RELATED APPLICATIONS

This application claims the benefit of Provisional Application Serial No. 60/198,206, filed Apr. 19, 2000, incorporated by reference herein in its entirety.

BACKGROUND OF THE INVENTION

This invention relates to methods for determining processing parameters of integrated circuits ("IC"s), and particularly to methods for determining variations in integrated circuit processing parameters and the cause thereof.

Analog ICs are specified by a set of performance metrics, such as gain, bandwidth, total harmonic distortion, slew rate and the like, which are measured during production and tested against specified limits, called performance specifications, to determine whether the ICs are good or bad. This process is known as specification testing. Analog ICs, in general, have many complex performance metrics that depend on a multitude of device parameters.

Parametric yield loss, that is, the failure of a significant portion of ICs manufactured to pass specification tests due to variations in process parameters, is often a problem in analog IC designs. Usually, a large number of designs are manufactured using the same manufacturing process and the dependencies of the performance of these designs on device parameters are often different. The tuning of the process to improve the yield for one design may adversely affect the yields for other designs. Process shifts over time can also cause a reduction in yield.

The dependencies of analog IC performance metrics on production process fluctuations are very complex and not known in closed form. The performance metrics of an analog IC depend on the values of a set of device parameters of the IC (Vt, Kn, number of transistors, resistivity, etc.). Yet, the ICs ordinarily comprise a large number of devices, such as transistors, resistors and capacitors whose nodes are not available for direct measurement to determine those device parameters.

Various techniques for diagnosing process fluctuations from measured device parameters have previously been disclosed in, for example, C. J. B. Spanos and S. W. Director, "Parameter Extraction for Statistical IC Process Characterization," IEEE Transactions on Computer-Aided Design, Vol. 5, CAD-5, January 1986, pp. 66–78; G. Freeman, W. Lukaszek, J. Y. C. Pan, "MERLIN: A Device Diagnosis System based on Analytic Models," IEEE Transactions on Semiconductor Manufacturing, Vol. 6, No. 4, November 1993, pp. 306–317; and M. Qu and M. A. Styblinski, "Parameter Extraction for Statistical IC Modeling Based on Recursive Inverse Approximation," IEEE Transactions on Computer-Aided Design of Integrated Circuits and Systems, Vol. 6, No. 11, November 1997, pp. 1250–1259. However, since device parameters can only be measured on a few test sites on a wafer, these procedures cannot be used to diagnose problems caused by variation of parameters between different chips on the same wafer. Also, the relationship between device parameters and the performance metrics of a circuit are often not known well enough to diagnose the cause of circuit performance variations in terms of variations in device parameters.

It has been shown previously that the device parameters which control a circuit's behavior can be computed from measurements made on the circuit, if the measurements satisfy certain diagnosability conditions. S. Cherubal and A. Chatterjee, "Parametric fault Diagnosis for Analog ICs Using Functional Mapping," Proceedings, Design Automation and Test in Europe, 1999, pp. 195–200 ("Cherubal and Chatterjee"), and E. Liu, W. Kao, E. Felt and A. Sangiovanni-Vincentelli, "Analog testability analysis and Fault diagnosis using behavioral modeling," Proceedings, IEEE Custom Integrated Circuits Conference, 1994, pp. 413–416. An efficient algorithm for the computation of device parameters has been disclosed in Cherubal and Chatterjee, supra.

Semiconductor ICs are manufactured in lots of wafers, which contain large numbers (typically thousands) of ICs. Each wafer contains a few sites which have special test structures which enable the measurement of device parameters (electrical test or "ET" measurements). If the ET parameters are within prescribed limits, specification tests are performed on the ICs on the wafer and the "good" ICs are diced, packaged and tested again against a full set of specifications. The limits on the ET measurements are usually set to be very wide, so that a wafer containing some good ICs is not rejected. Analog ICs often face yield problems wherein a set of the ICs on a wafer fails the specification tests, while the ET data is within limits.

Two typical yield problems are shown in FIG. 1(a) and FIG. 1(b), which illustrate possible histograms of performance metrics of ICs. In FIG. 1(a) a shift in a process parameter causes yield loss (shaded region) while in FIG. 1(b) a large variance in a performance metric causes loss in yield. These yield problems are often caused by the variation of device parameters across a wafer, that is, chip-to-chip variation in device parameters.

The IC manufacturing process may be modelled hierarchically, as shown in FIG. 2. Every step in the manufacturing process is affected by a set of process disturbances, such as changes in diffusivity of dopants, oxide growth rates, and the like, which result in fluctuations in device parameters of ICs.

The device parameters in turn control the performance metrics of ICs, which determine yield. The process disturbances cause the device parameters vary from lot-to-lot, from wafer to wafer within a lot, and from IC to IC within a wafer. The lot-to-lot and wafer-to-wafer variations can be monitored by measuring the device parameters using the wafer test structures. However, in the current manufacturing methodology there is no way of directly monitoring the variation of device parameters across ICs on a wafer. This makes the diagnosis of yield problems caused by the variation of device parameters within a wafer extremely difficult.

SUMMARY OF THE INVENTION

The present invention solves the aforementioned problems and meets the aforementioned needs by estimating the device parameters of a given circuit from the output of the circuit stimulated with an input that is optimized for this purpose. Once the optimum test signal has been identified, a regression model is constructed to relate measured circuit performance metrics to the estimated device parameters. A non-linear cause-effect analysis is used to diagnose the process cause of the variation in device parameter values. This information can be used by process engineers to tune the manufacturing process to improve yield.

Accordingly, it is a principle object of the present invention to provide a novel and improved method for diagnosing process parameter variations from measurements in analog circuits.

It is another object of the present invention to provide a novel method for computing device parameters from circuit performance metrics in the presence of noise.

It is a further object of the present invention to provide a novel method for generating an optimum test signal for determining device parameters of an analog circuit based on performance metrics of an output signal generated in response to the optimum test signal.

It is yet another object of the present invention to optimize the number of device parameters of an analog integrated circuit that can be determined with a given degree of accuracy from circuit performance metrics.

It is yet a further object of the present invention to provide a novel method for determining the processing cause of variations in circuit performance metrics from their ideal.

The foregoing and other objects, features, and advantages of the invention will be more readily understood upon consideration of the following detailed description of the invention, taken in conjunction with the accompanying drawings.

BRIEF DESCRIPTION OF THE DRAWINGS

FIGS. 9(a)–(d) show the results of a cause-effect analysis for the operational amplifier of FIG. 4, according to the present invention.

A PREFERRED EMBODIMENT

DETAILED DESCRIPTION OF THE INVENTION

In the prior art, test structures on a wafer are used to measure test device parameters for inferring whether the wafer as a whole is "good" or "bad." If such testing indicates that the wafer is "good," performance testing is conducted on each of the ICs on the wafer to obtain the performance parameters for the ICs. These are compared to specification limits to determine whether the ICs individually pass muster. Such performance testing typically employs a number of test stimuli, each being adapted to elicit a particular performance parameter from the IC. While this methodology is satisfactory for characterizing the performance metrics for the individual ICs, it does not assist the manufacturing engineer in tuning or altering the process to improve yield. This is because knowledge of performance metrics for the ICs is too difficult to relate to the manufacturing process parameters responsible therefor.

Figure 1A:
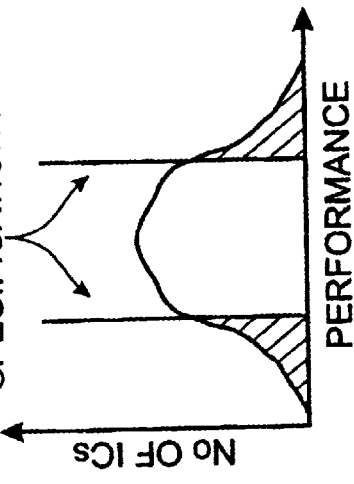
FIG. 1(a) is a graph of a histogram of a performance parameter showing the loss in integrated circuit manufacturing yield resulting from a shift in the performance parameter.
Figure 1B:
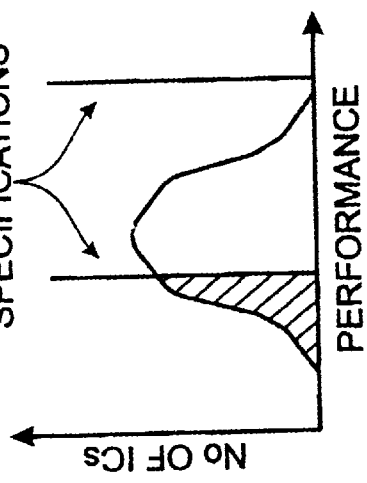
FIG. 1(b) is a graph of a histogram of a performance parameter showing the loss in integrated circuit manufacturing yield resulting from a large variance in the performance metric.
Figure 2:
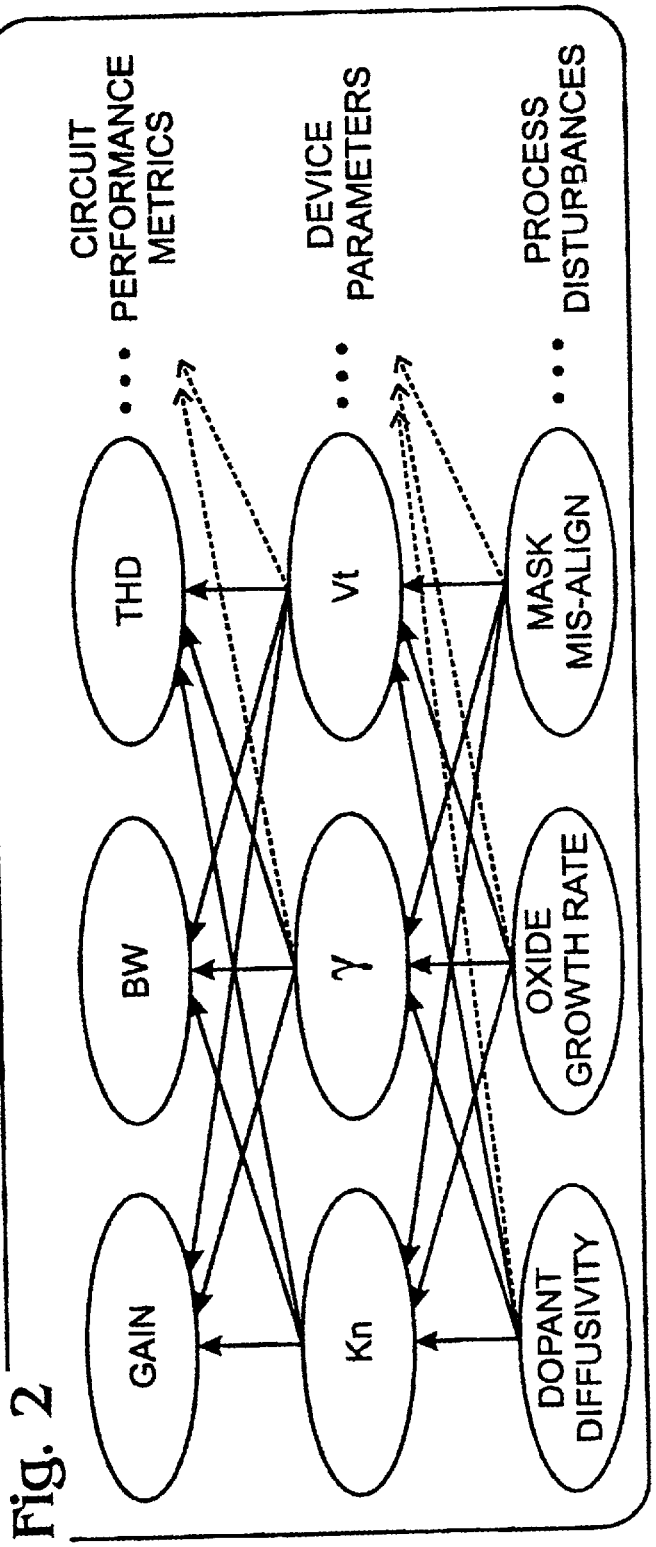
FIG. 2 is a diagram illustrating the hierarchical model for an integrated circuit manufacturing process.

However, referring back to FIG. 2, the present inventors have recognized that circuit performance metrics may be related to device parameters even though it is not practical to relate the circuit performance metrics to process disturbances further upstream. The device parameters for a given IC are estimated, according to the present invention, preferably by stimulating the IC with a test signal, obtaining a response, and the response along with the measured performance parameters for the IC obtained during the aforementioned performance testing, to solve for the device parameters of each IC. IC manufacturing engineers have known how to adjust the process to impact device parameters; therefore, the estimated device parameters obtained according to the present invention are directly useful for tuning the process to optimize yield.

Further, according to the invention, the test signal is optimized for stimulating the ICs to produce outputs from which device parameters can most accurately be estimated.

Measurements made on an IC for a given manufacturing process depend on the device parameters for an IC as follows:

$$\overline{m} = f(\overline{p}) \overline{m} \in \Re^{n_p} \overline{p} \in \Re^{n_m} \tag{1}$$

where m is a set of measurements made on the IC, p is the set of device parameters, $n_p$ is the number of device parameters, and $n_m$ is the number of measurements.

This relationship is usually not known in closed form and is evaluated using circuit simulation. Given a set of performance measurements made on an IC, Equation 1 becomes a set of non-linear equations in multiple variables, which can be used to solve for the device parameters using iterative numerical techniques. This can be computationally very expensive for large IC designs due to excessive simulation times, as the functional dependence of Equation 1 has to be evaluated using circuit simulation. It is possible to approximate the functional dependence using nonlinear regression techniques, as shown in Cherubal and Chatterjee, supra. This replaces computationally expensive circuit simulation with function evaluations, thereby reducing the cost of computing device parameters. The regression models are built using a training technique requiring repeated circuit simulation, and incurs a one-time simulation cost. However, methods according to the present invention automatically generate tests to aid diagnosis, and provide techniques for relating yield problems to the variation in device parameters.

Figure 3:
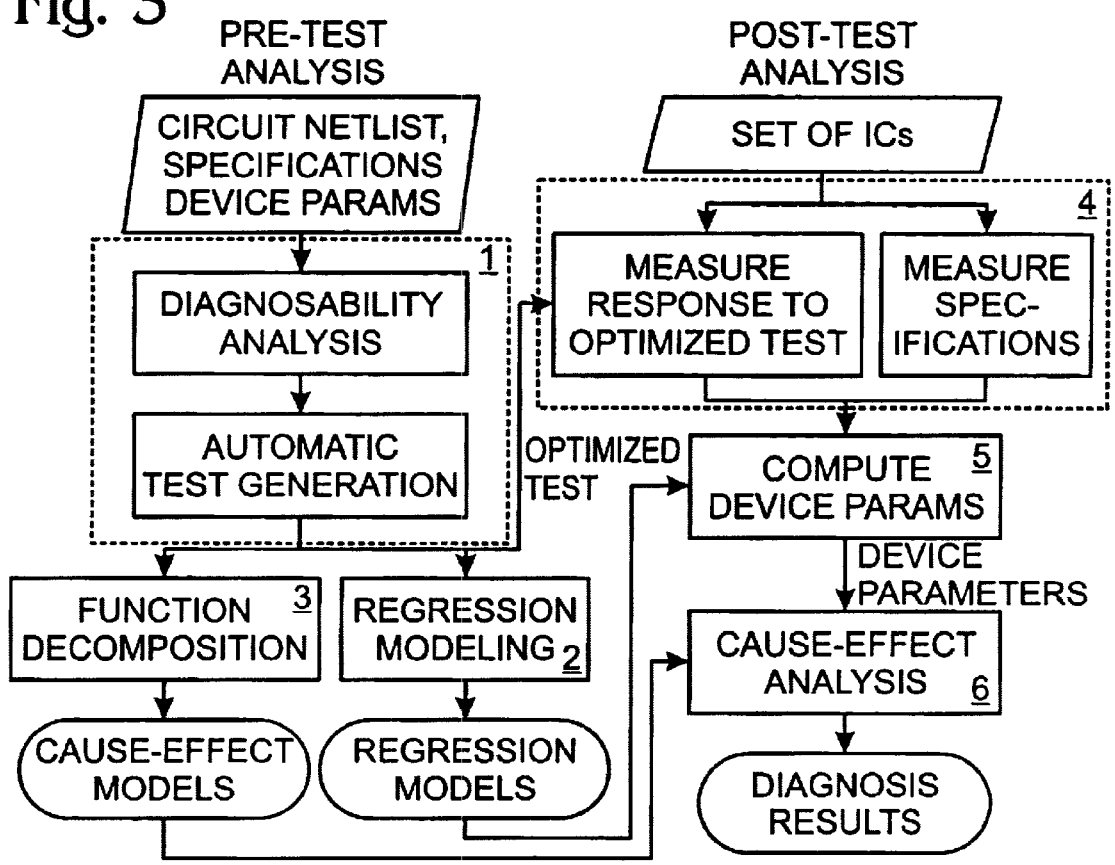
FIG. 3 is a block diagram of a method for diagnosis of device parameters for analog circuits according to the present invention.

Refering to FIG. 3, the method generally comprises a pre-test analysis and post-test processing.

First, in the pre-test analysis, a diagnosabilty analysis is performed to determine whether the device parameters can be accurately computed from the set of performance metrics of the IC. If this is not possible, optimized test stimuli are generated which allow the unique identification of device parameters that can cause yield problems. Non-linear regression models are built, which relate the performance metrics and the optimized test response of the IC to the device parameters. These regression models are used in the post-test processing to solve for the values of device parameters of ICs from their responses to the optimized test stimuli. To diagnose yield problems, the contribution of each device parameter to variation in performance of ICs is identified. Therefore, the regression models for the performance metrics are decomposed to the individual model components pertaining to each device parameter and those due to interaction between parameters.

During the post-test phase, when there is observed yield loss for an IC design, the optimized tests are applied to a set of ICs having yield problems and their response is measured. The device parameters for each individual IC are computed from their responses to the optimized test. Using the decomposed regression models, the effect of the computed device parameter variations on the performance of the ICs is analyzed.

Pre-Test Analysis
A. Diagnosability Analysis and Optimization

To diagnose the cause of variation in performance metrics of an IC, device parameters for the IC must be known. Sensitivity based heuristic analysis is used to determine whether the parameters can be uniquely computed from the set of performance metrics for a given IC. If the parameters cannot be uniquely determined from the set of performance metrics based on conventional test signals, tests acording to the present invention are automatically generated that will facilitate the accurate estimation of IC device parameters. The automatic test generator comprises a test cost function, which is used to evaluate the goodness of a test, and a search algorithm for finding the optimal test stimulus. The automatic test generator uses a genetic algorithm ("GA") -based optimization procedure for finding the optimal stimulus. GAs are well understood in the art and can be used to find globally optimal solutions for complex search and optimization problems with many local minima, as shown in D. E. Goldberg, Genetic Algorithms in Search, Optimization and Machine Learning, Addison-Wesley, 1989. GAs have been used, for example, in test generation for analog circuits for fault isolation S. Chakrabarti and A. Chatterjee, "Partial Simulation-driven Test Generation for Fault Detection and Diagnosis in Analog Circuits," Proceedings, ICCAD, 2000, pp. 562–567 and for fault detection P. N. Variyam and A. Chatterjee, "Specification-driven Test Design for Analog Circuits," Proceedings, IEEE International Symposium on Defect and Fault Tolerance in VLSI Systems, 1998. pp. 335–340.

1. Diagnosability

The number of parameters of a circuit that can be uniquely determined from a set of measurements made on the circuit is given by $$n_d = rank(S) \quad (2)$$

where S is the sensitivity matrix given by $$S = \begin{bmatrix} \frac{\partial m_1}{\partial p_1} \cdot p_1 & \frac{\partial m_1}{\partial p_2} \cdot p_2 & \cdots & \frac{\partial m_1}{\partial p_{n_p}} \cdot p_{n_p} \\ \frac{\partial m_2}{\partial p_1} \cdot p_1 & \frac{\partial m_2}{\partial p_2} \cdot p_2 & \cdots & \frac{\partial m_2}{\partial p_{n_p}} \cdot p_{n_p} \\ \cdots & \cdots & \cdots & \cdots \\ \frac{\partial m_{n_m}}{\partial p_1} \cdot p_1 & \frac{\partial m_{n_m}}{\partial p_2} \cdot p_2 & \cdots & \frac{\partial m_{n_m}}{\partial p_{n_p}} \cdot p_{n_p} \end{bmatrix} \quad (3)$$

The rank of a matrix is given by the number of its non-zero singular values. However, due to the effects of measurement noise, the parameters often cannot be computed accurately even though the aforementioned condition is satisfied. Therefore, the effect of measurement noise on the errors in the computed values of parameters must be considered.

Each of the measurements in m is assumed to be affected by measurement noise $e_m$ having a variance of $\sigma_m^2$. If different measurements have different variances in measurement noise, the measurements can be normalized, so that they all have the same variance in measurement noise. In the presence of noise, Equation 1 becomes $$\bar{m}_o + \bar{e}_m = \bar{f}(\bar{p}_o + \Delta\bar{p}) \quad (4)$$

where $m_o$ and $p_o$ are the true (noise-free) values of measurements and parameters respectively.

Assuming that the measurement noise is small, the error can be approximated by a linear function about $p_o$ to get $$\bar{f}(\bar{p}_O + \Delta\bar{p}) = \bar{f}(\bar{p}_O) + S \cdot \frac{\Delta\bar{p}}{\bar{p}} \quad (4)$$

where S is the sensitivity matrix given in Equation 3.

Since $m_o = f(p_o)$, Equation 4 becomes $$S \cdot \frac{\Delta\bar{p}}{\bar{p}} = \bar{e}_m \quad (5)$$

The effect of measurement noise can be analyzed using the singular value decomposition ("SVD") of S. SVD, which is described for example in D. S. Watkins, Fundamentals of Matrix Computations, John Wiley and Sons, 1991, decomposes a matrix into the product of three matrices as $$S = U \cdot \Sigma \cdot V^T \quad (6)$$

where U and V are orthonormal matrices ($U^T.U=I$ and $V^T.V=I$, I is the identity matrix), and Σ is a diagonal matrix with decreasing positive diagonal elements. Substituting Equation 6 into Equation 5, with $UU^T=I$, produces $$\frac{\Delta\bar{p}}{\bar{p}} = V \cdot \Sigma^{-1} \cdot \bar{e}'_m = \sum_{i=1}^{n_p} \bar{V}_i \cdot \frac{e'_{mi}}{\Sigma_i} \quad (7)$$

where $V_i$ is the $i^{th}$ column of V, $e'_{mi}$ is the $i^{th}$ element in $U^T.e_m$, and $\Sigma_i$ is the $i^{th}$ diagonal element of $\Sigma$. Since U is orthonormal, it can be shown that the variance of $e'_{mi}$ is $\sigma_m^2$. The expected sum of squared errors in device parameters is then computed as $$E\left(\sum_{i=1}^{n_p} \left(\frac{\Delta p_i}{p_i}\right)^2\right) = \sum_{i=1}^{n_p} \frac{\sigma_m^2}{\Sigma_i^2} \quad (8)$$

where E( ) is the expectation operator.

At this point, the object is to make the Left Hand Side (L.H.S) of Equation 8 to be less than a pre-defined constant, K, the average squared error in computed parameters needs to be less than $K/n_p$. Then, the number of parameters that can be solved for from the given set of measurements is $$n_d = \max(n) \, s.t. \sum_{i=1}^{n} \frac{\sigma_m^2}{\Sigma_i^2} < K \qquad (9)$$

This condition is based on differential sensitivity, which is valid only for small changes in parameters. Therefore, Equation 9 must be evaluated at every point in the device parameter space (the space spanned by the range of possible variations of parameters) to ensure diagnosability. However, this may prove to be computationally too expensive. Therefore, the heuristic of evaluating Equation 9 is preferably used only to obtain nominal values of device parameters as an estimate of diagnosabilty.

2. Optimization

Where the diagnosis procedure fails to show that all of the device parameters can be uniquely determined to a desired degree of accuracy based on conventional test signals, a procure is undertaken to find the optimum test signal, that is, the test signal that allows the most, or the most important, device parameters to be determined within a desired degree of accuracy. A test cost function is determined as follows for evaluating the goodness of tests during optimization.

The procedure stars with an augmented sensitivity matrix, given by $$S = \begin{bmatrix} S_p \\ S_n \end{bmatrix} \qquad (10)$$

where $S_p$ is the sensitivity matrix of the performance measurements, and $S_n$ is the sensitivity matrix of the newly generated test.

An SVD is performed on S and the singular values $\Sigma_i$ are computed. Since the object is to minimize the error in the values of computed parameters, Equation 8 can be used as a cost function to be minimized. However, this has a tendency to be dominated by a few small $\Sigma_i$ (large values of $\Delta p_i/p_i$), resulting in poor quality tests being generated. Therefore, it is preferred that the following cost function to be maximized:

$$C - \sum_{i=1}^{n_p} sat\left(\frac{\Sigma_i^2}{\Sigma_{max}^2}\right) \quad sat(x) - \begin{cases} x & x < 1 \\ 1 & x \geq 1 \end{cases} \qquad (11)$$

where $\Sigma_{max}$ is a constant related to the minimum accuracy in computed parameters, K.

This cost function maximizes the singular values, which has the same effect as minimizing the reciprocals of the singular values. A saturating function sat( ) is applied to $\Sigma_i$ so that the cost function cannot be dominated by a few large, singular values.

As can be seen by comparing equations (11), (6) and (3), the cost function depends on a sensitivity matrix S and, more particularly, the performance parameters circuit in response to a given test signal. The cost function (Eqn 11) is minimized by optimizing the test signal, i.e., iterating the test signal in a computer simulation of the circuit's response thereto until the cost function is minimized. Preferably, the test signal is selected to be a piece-wise linear ("PWL") function of time having a relatively small number of breakpoints, such as five to ten breakpoints, and optimization of the test signal is preferably accomplished with a genetic algorithm (GA).

GAs are stochastic optimization algorithms which encode a given problem into a genetic string or chromosomes, and perform operations patterned on the principles of evolution for optimization. GAs maintain a set of potential solutions to the given problem from which new solutions are created by the genetic operations of selection, crossover and mutation. PWL waveforms have shown great promise in automatic test generation for replacing performance tests, P. N. Variyam and A. Chatterjee, "Specification-driven Test Design for Analog Circuits," Proceedings, IEEE International Symposium on Defect and Fault Tolerance in VLSI Systems, 1998. pp. 335–340; P. N. Variyam and A. Chatterjee, "Test generation for comprehensive testing of linear analog circuits using transient response sampling," Proceedings, ICCAD, 1997, pp. 382–385; and R. Voorakaranam and A. Chatterjee, "Test Generation for Accurate Prediction of Analog Specifications," Proceedings, IEEE VLSI Test Symposium, 2000, pp. 137–142, and for distinguishing failure modes S. Chakrabarti and A. Chatterjee, "Partial Simulation-driven Test Generation for Fault Detection and Diagnosis in Analog Circuits," Proceedings, ICCAD, 2000, pp. 562–567. This optimization process is general and can also be applied to other types of waveforms such as multi-frequency tests. A more detailed description of using GA for optimizing PWL waveforms can be found in P. N. Variyam and A. Chatterjee, "Specification-driven Test Design for Analog Circuits," Proceedings, IEEE International Symposium on Defect and Fault Tolerance in VLSI Systems, 1998. pp. 335–340.

B. Regression Modeling

Once the test signal is optimized, a regression model is constructed that relates the device parameters of a circuit or device under test ("DUT") to an augmented set of measurements consisting of performance parameter measurements and the output response of the DUT to the optimized test signal. A commonly-used regression modeling tool known as MARS (Multivariate Adaptive Regression Splines) is particularly suitable for this purpose. MARS is described, for example, in J. H. Friedman et al., "Multivariate Adaptive Regression Splines," The Annals of Statistics, Vol. 19, No, 1, pp. 1–141. MARS is able to model nonlinear functions with a large number of independent variables and can adapt to the degree of nonlinearity of the function being modeled. MARS has been used for statistical fault simulation, test generation, and parametric fault diagnosis. MARS produces piece-wise polynomial functions of the form $$y = \sum_{i=1}^{M} a_i B_i(\overline{x}) \qquad (12)$$

where $B_m(x)$ are basis functions which are products of simple first order spline functions.

MARS needs as input a set of training data, or samples of the input and output variables of the regression model. Here, the set of input variables are the device parameters and the set of output variables are the augmented set of measurements.

To generate the training data required for building the MARS regression model, circuit simulation is used. In this process, a set of device parameter variations are randomly generated and measurements on the IC DUT are simulated using the generated device parameter variations. This set of parameter variations and simulated measurements are used to build the regression model given in Equation 12 above.

Post-Test Processing

Once an optimized test signal has been determined for a given circuit and the regression model relating the circuit output to the circuit performance parameters has been constructed, device parameters for the circuit may be estimated according to the invention. The optimized test signal is applied to a physical device and the performance parameters for the device are measured. These metrics are then processed as follows.

A. Computing Process Parameter Values

As explained in Cherubal and Chatterjee, supra, it is possible to solve for the device parameter values of the DUT from measurements made thereon. Equation 1 represents a set of nonlinear equations in multiple variables. The set of measurements obtained from the DUT forms the Right Hand Side (R.H.S) of this set of equations. Therefore, the values of the device parameters can be solved for, from the regression model using numerical techniques, e.g., those described in J. M. Ortega and W. C. Rheinbolldt, "Iterative Solution of Nonlinear Equations in Several Variables", New York, Academic, 1970. In the present invention, it is preferred that a Newton-Raphson (N-R) iterative procedure be (one of the numerical techniques described in J. M. Ortega and W. C. Rheinholt, supra) used to solve for the device parameters. N-R starts with an initial guess for the solution of a set of non-linear equations and approximates the non-linear equations as linear using the slope of the set of equations at the initial guess. For the non-linear set of equations $m=f_{pm}(p)$ a step in the N-R iteration consists of $$\bar{p}_{i+1} - \bar{p}_i = J(\bar{p}_i)^{-1} \cdot (\bar{m} - f_{pm}(\bar{p}_i)) \quad (13)$$

where $p_i$ and $p_{i+1}$, are the guesses for the parameter values, and $J(p_i)$ is the Jacobian matrix of $f_{pm}(p)$ at $p_i$. The Jacobian is a matrix each row of which consists of the partial derivatives of each equation in $f_{pm}(p)$ with respect to the device parameter values $p_i$.

The regression model that relates the measurements made on the DUT to the performance parameters is used to evaluate $f_{pm}(p)$ and $J(p_i)$. This reduces the complexity of solving Equation 1. It may not always be possible to compute all the parameters accurately from the test responses. Groups of parameters for which parameters cannot be uniquely identified are called ambiguity groups. In case ambiguity groups exist, they are identified using the technique in E. Liu, W. Kao, E. Felt and A. Sangiovanni-Vincentelli, "Analog testability analysis and Fault diagnosis using behavioral modeling," Proceedings, IEEE Custom Integrated Circuits Conference, 1994, pp. 413–416. It can be shown that, ambiguity groups result in columns of the Jacobian that are linearly dependent on each other. Since each column of the the Jacobian matrix corresponds to a specific device parameter, the device parameters that make up each ambiguity group are identified as the device parameters corresponding to the linearly dependent columns of the Jacobian matrix. When ambiguity groups exist, the matrix inverse $(J(p_i)^{-1})$ required in Equation 13 cannot be directly computed. Therefore, one device parameter from each ambiguity group, is kept a constant and the corresponding column is removed from $J(p_i)$ so that the matrix inverse required for Equation 13 can be computed. Since one parameter from each ambiguity group is kept a constant during each iteration, only one of the infinitely many possible solutions for each of the device parameter values is computed, in case ambiguity groups exist.

B. Cause-Effect Analysis

The purpose of the cause-effect analysis is to find the cause of variation in the performance parameters in terms of the variation in the device parameters. This will help identify the causes of yield loss in terms of the device parameters. For this analysis we use the regression model (Eqn 12) constructed above. which relate the performance parameters of the DUT to the device parameters. These regression models are created during the regression model construction step described below. The regression model which is the output of MARS can be decomposed to identify the contributions of different input parameters to the model. This analysis is described as ANOVA (ANalysis Of VAriance) decomposition in Friedman, supra. This analysis is the decomposition applied to the regresion functions that are the outputs of the MARS modeling process. Since the output of MARS is a set of simple polynomial spline functions, they can be decomposed into functions that correspond to a single variable, functions that correspond to a product of two variables, and so on. The ANOVA decomposition resolves $f_{pm}(p)$ into a set of functions in the form $$f_{pm}(\bar{p}) = \sum_i f_i(p_i) + \sum_{i,j} f_{i,j}(p_i p_j) + \sum_{i,j,k} f_{i,j,k}(p_i p_j p_k) + \ldots \quad (14)$$

where the first sum give the contributions of individual variables, the second sum gives the contributions due to two variable interaction, and so on.

The functions $f_i(p_i)$ give the contribution of the device parameter $p_i$ to the variation performance parameter. The functions $f_{i,j}(p_i p_j)$ gives the contribution of the interaction between parameters $p_i$ and $p_j$.

Given a set of diagnosed parameters for a set of ICs, the individual component functions in the ANOVA decomposition ($f_i, f_{i,j}, \ldots$) can be evaluated to compute the contribution of each parameter and that of parameter interactions on the variation in IC performance. To compute the effect of a parameter $p_i$, the mean and variance of $f_i(p_i)$ are estimated using $$\hat{m}_{p_i} = \frac{1}{N} \sum_{j=1}^{N} f_i(\hat{p}_{i,j}) \quad (15)$$

$$\hat{\sigma}^2_{p_i} = \frac{1}{N-1} \sum_{j=1}^{n} (f_i(\hat{p}_{i,j}) - \hat{m}_{p_i})^2 \quad (16)$$

respectively, where $\hat{p}_{i,j}$ is the computed value of $p_i$ for IC number j. The mean and variance of effects due to interactions between parameters is estimated in a similar way using $f_{i,j}$.

EXAMPLE

Figure 4:
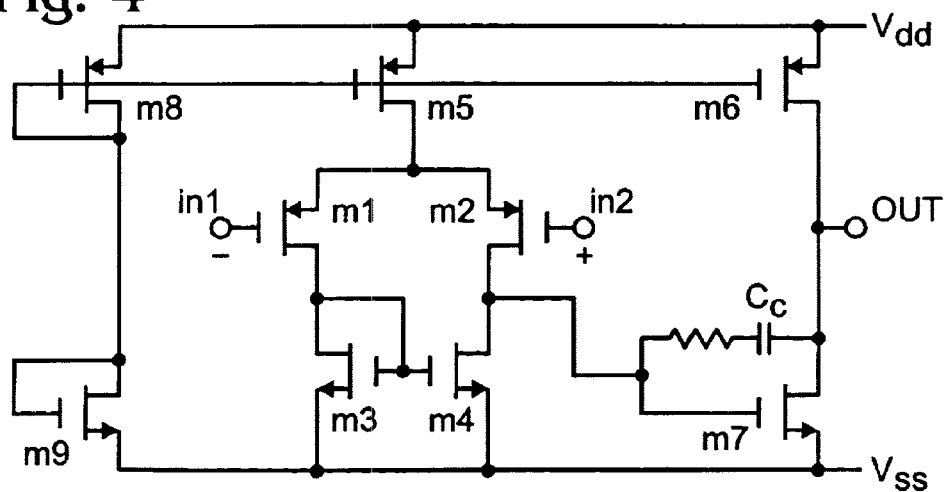
FIG. 4 a schematic diagram of an integrated circuit operational amplifier used in an example.

By way of example, the aforedescribed methodology was applied to a CMOS opamp described in the ITC mixed-signal test benchmarks B. Kaminska, K. Arabi, I. Bell, P. Goeteti, J. L. Huertas, B. Kim, A. Rueda and M. Soma, "Analog and Mixed-signal Benchmark Circuits-First Release," Proceedings, International Test Conference, 1997, pp. 183–190. The circuit is a high-speed operational amplifier manufactured in a CMOS process and is a typical analog circuit for the application of the proposed methodology. This circuit is shown in FIG. 4. All experiments were done on a 350 MHz Sun-Ultra-10 workstation. The diagnosability of device parameters for the circuit was analyzed and tests were generated to aid the computation of device parameters as described above. Regression models were built relating the device parameters to the output response of the circuit as described above. 400 circuit simulations were needed to create the regression models, which took 1.2 hours of CPU time.

A. Device Parameter Computation Results

Device parameters were computed from the automatically generated tests and performance measurements. This was done by simulating random variations in all device parameters of the opamp for a set of devices, and then computing the device parameters from the test response.

Figure 5:
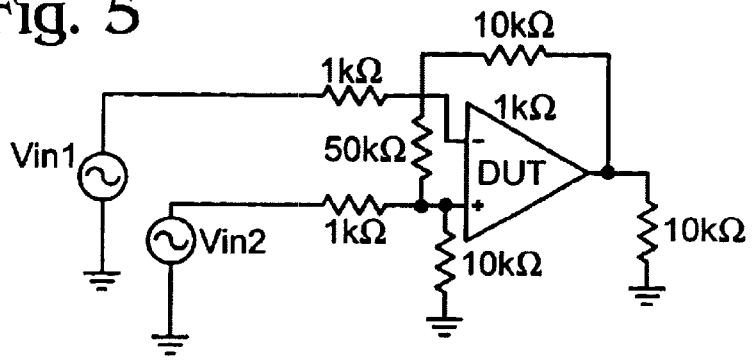
FIG. 5 is a schematic diagram of an alternative test configuration for the operational amplifier of FIG. 4.
Figure 6:
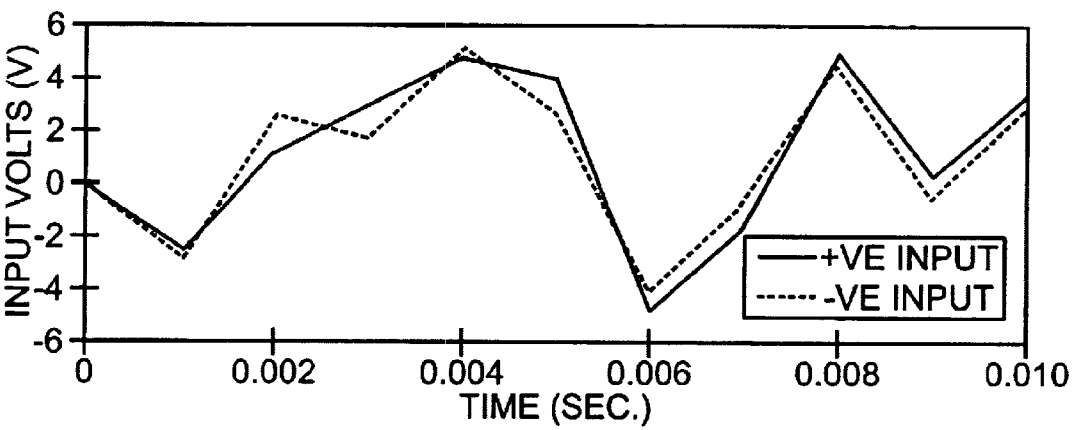
FIG. 6 is a graph of the response of the operational amplifier of FIG. 4 to a test signal according to the present invention.
Figure 6:
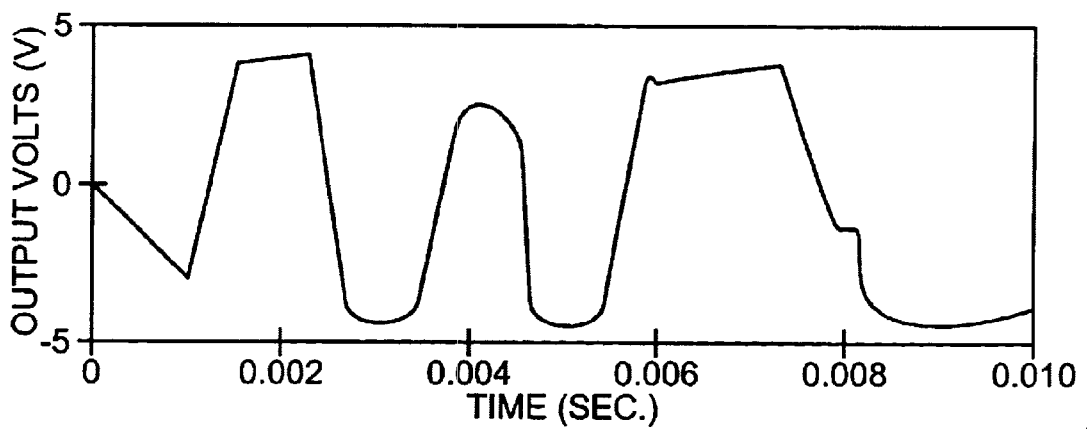

The process parameter variations for the opamp are shown in Table 1. Performance tests for the opamp included offset voltage, slew rate, large signal gain, Common Mode Rejection Ratio (CMRR) and Power Supply Rejection Ratio ("PSRR"). These are some of the common performance parameters measured for operational amplifiers. Accurate computation of device parameters was not possible from the performance measurements alone. Alternate tests were generated for the CMOS opamp using the circuit configuration shown in FIG. 5. The optimized tests and nominal circuit response for the CMOS opamp are shown in FIG. 6.

TABLE 1

Device parameters for CMOS opamp

| Parameter | Max | Min | Parameter | Max | Min |
|---|---|---|---|---|---|
| $xl_p$ | 0.3 μm | -0.3 μm | $xl_n$ | 0.3 μm | -0.3 μm |
| $xw_p$ | 0.3 μm | -0.3 μm | $xw_n$ | 0.3 μm | -0.3 μm |
| $ld_p$ | 0.03 μm | 0.1 μm | $ld_n$ | 0.03 μm | 0.1 μm |
| $Vt_p$ | -0.65 V | -1.05 V | $Vt_n$ | 0.60 V | 1.0 V |
| $\gamma_p$ | 0.2 | 0.6 | $\gamma_n$ | 0.3 | 0.8 |
| $tox_p$ | 225 A° | 275 A° | $tox_n$ | 225 A° | 275 A° |
| Cc | 1.1pF | 0.9pF | Rc | 2.5 kΩ | 1.5 KΩ |

Figure 7:
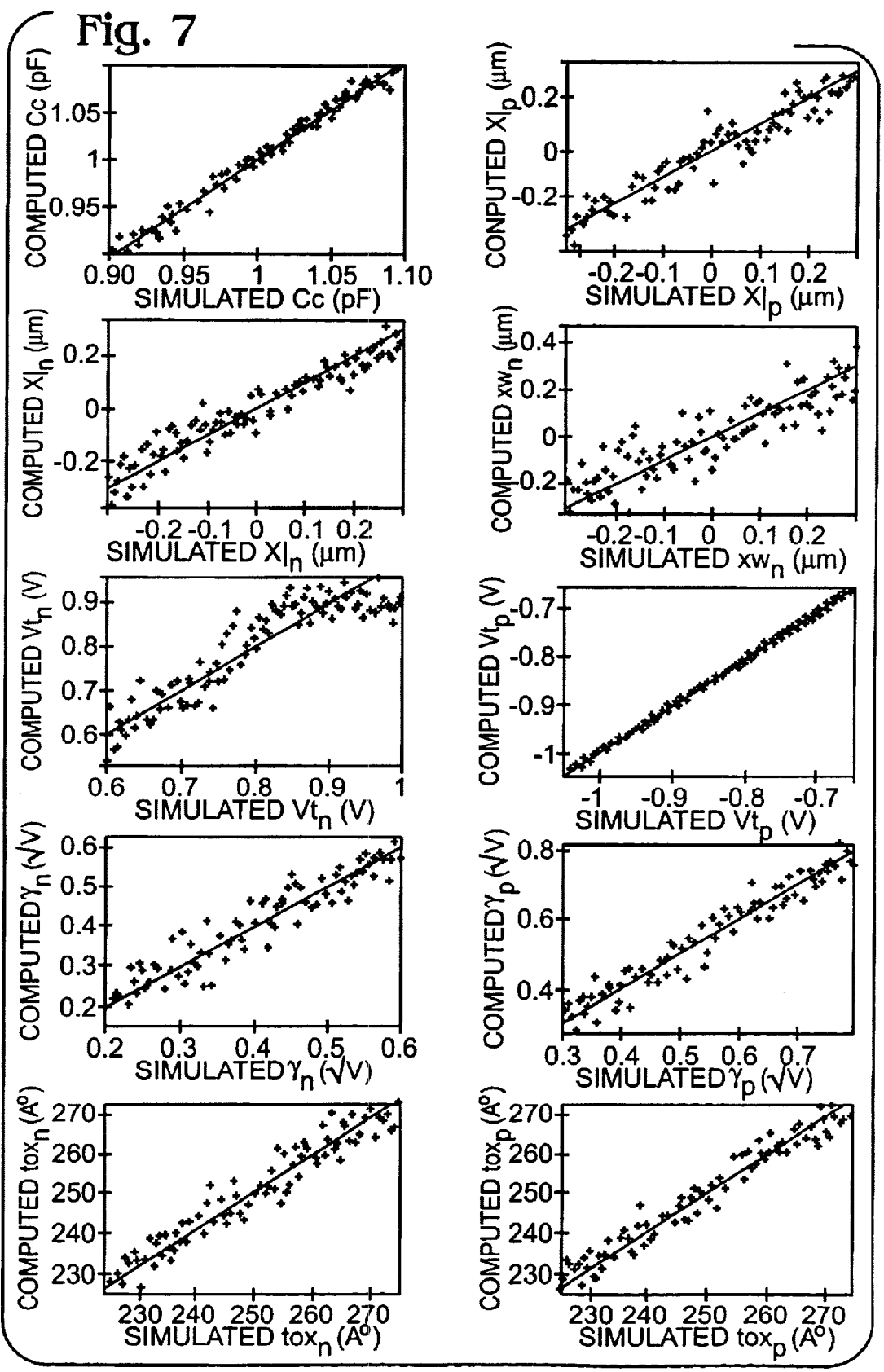
FIG. 7 is shows graphs comparing simulated and computed results of tests on the operational amplifier of FIG. 4 for various device parameters.

The optimized test response was sampled at a frequency of 100 kHz to form the alternate test measurements. A measurement noise of 6 mV peak-to-peak was assumed for the transient response and that of 1 mV peak-to-peak for DC measurements. To test the device parameter computation technique, random circuit instances were generated by varying all the device parameters of the circuit. Measurement noise was simulated by adding Gaussian distributed random numbers to the simulated test responses. Device parameter computation was attempted from the simulated test responses. The comparison of the simulated and computed parameters for the device parameters of the opamp is given in FIG. 7.

The 'true' (simulated) value for each parameter is given by the straight line while the computed values for the device parameters are marked by '+' signs. The device parameter computation algorithm is able to compute all but 4 parameters (Rc, $ld_p$, $ld_n$, $xw_p$) accurately. It is seen that the computed parameters track the simulated parameters, proving the effectiveness of the generated test and the device parameter computation algorithm. The CPU time required to compute the device parameters from the test response was 29.1 milliseconds per IC.

B. Cause-Effect Analysis

Figure 8:
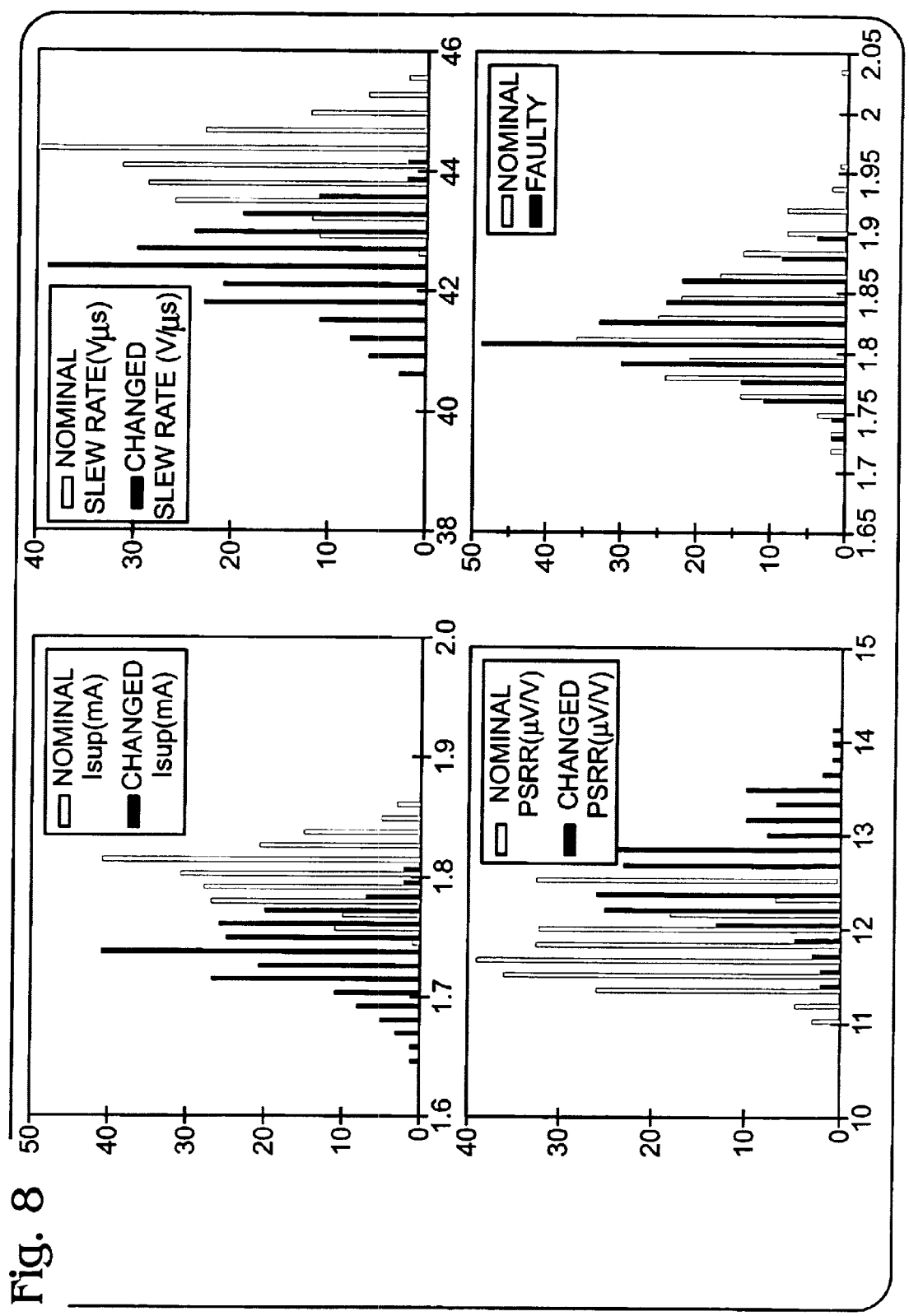
FIG. 8 shows the effect of changes in device parameters on operation amplifier circuit metrics.

The above-described cause-effect analysis methodology was analyzed using a simulated scenario, where a shift in the mean value of device parameters (process shift) and increased variance in device parameters (poor process control) cause yield loss. The cause-effect analysis method is shown to correctly diagnose the cause of yield loss. To study the effectiveness of the cause effect analysis two case studies were performed. In the first case, a Monte Carlo simulation of the circuit was performed to generate a set of IC instances and the performance metrics of these ICs were measured. This was considered the nominal statistical distribution of device performance. In the second case, circuit instances were generated with change in nominal values and increased variances introduced into all the device parameters to simulate a process shift and poor control of process, respectively. This is considered the new or faulted distribution of device performance. It was found that four of the opamp's performance metrics, namely, slew rate ("SR"), supply current ("$I_{sup}$") PSRR and large signal gain ("$A_v$") were affected by this change in device parameter statistics. The histograms of the normal and faulted IC performance metrics are shown in FIG. 8.

The device parameter values for the faulted set of ICs were computed as described above. The cause-effect analysis was performed on the second set of ICs to diagnose the causes of drift and increased in variance of performance metrics. The results of cause-effect analysis on the affected ICs is shown in FIG. 9. The bar-graphs on the left side of FIG. 9(a), (b), (c) and (d) show the relative contributions of various device parameters to the drift in performance metrics. It can be seen that the shift (reduction) in slew rate is mainly due to the shifts in the device parameters $tox_n$, and $Vt_n$. Therefore, those parameters must be tuned to improve the slew-rate of the set of ICs. Similar inferences may be made about the shift in supply current. The pie-charts on the right of FIG. 9(a) (b), (c) and (d) show the relative contributions of each device parameter variation to the variance of each performance.

For example, it can be seen that the major portion of the variance in slew rate is caused by the variation in $tox_n$ and $xw_n$. Better control of these parameters is required to reduce the variance in slew rate. The portion of the bar-graphs pie-charts labeled 'Error' refers to the part of the variation that could not be explained by the variation in any of the parameters considered. It is seen that the technique is able to diagnose a major portion of the cause of shift and variance in circuit performance parameters. The technique is able to track variation in performance caused by the interaction between parameters as can be seen from FIG. 9(b) (a significant portion of the variance in PSRR is caused by the variation in $tox_n$ and $Vt_n$). This information can be used to provide feedback to process engineers to tune the manufacturing process to improve yield.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for determining device parameters of an analog integrated circuit based on circuit performance metrics, comprising:

constructing a model of the analog integrated circuit having an input and an output;

applying a candidate signal to said input of said analog integrated circuit so as to produce an output signal;

measuring circuit performance metrics from said output signal;

performing a sensitivity-based heuristic analysis to determine whether said device parameters can be uniquely determined from said performance metrics in response to said candidate signal and, where said device parameters can be uniquely determined from said performance metrics, accepting said candidate signal as a test signal; and where said device parameters cannot be uniquely determined from said performance metrics, performing an optimization procedure to find the optimum test signal, said optimization procedure comprising defining a test cost function based on said performance metrics and acceptable accuracy in determining said device parameters, and successively applying different new candidate signals until said test cost function reaches an acceptable value, then accepting the most recent new candidate signal as the test signal.

2. The method of claim 1, wherein a simulation model is used for said model.

3. The method of claim 1, wherein said optimization procedure applies a genetic algorithm.

4. The method of claim 1, further comprising constructing a regression model, based on said test signal, ideal circuit performance metrics and ideal device parameters, for relating measured circuit performance in response to said test signal to actual device parameters.

5. The method of claim 4, wherein a simulation model is used for said model.

6. The method of claim 4, wherein said optimization procedure applies a genetic algorithm.

7. The method of claim 4, further comprising testing an physical circuit by generating said test signal, applying said test signal to said input of said physical circuit, measuring said circuit metrics in response to said test signal, and applying said measured circuit metrics to said regression model to produce said device parameters.

8. The method of claim 7, further comprising decomposing the output of said model to determine the effect of varying a device parameter on the circuit performance metrics.

* * * * *

UNITED STATES PATENT AND TRADEMARK OFFICE
CERTIFICATE OF CORRECTION

PATENT NO. : 6,625,785 B2
DATED : September 23, 2004
INVENTOR(S) : Abhijit Chatterjee and Sasikumar Cherubal It is certified that error appears in the above-identified patent and that said Letters Patent is hereby corrected as shown below:

Column 14,
Line 7, change "testing an physical" to -- testing a physical --.

Signed and Sealed this

Twenty-first Day of December, 2004

JON W. DUDAS
*Director of the United States Patent and Trademark Office*